United States Patent
Johnson

(10) Patent No.: US 10,233,022 B2
(45) Date of Patent: Mar. 19, 2019

(54) DRAPER BELT HAVING IMPROVED CLEAT DESIGN

(71) Applicant: ContiTech Transportbandsysteme GmbH, Hannover (DE)

(72) Inventor: David W. Johnson, Lincoln, NE (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/761,258

(22) PCT Filed: Sep. 12, 2016

(86) PCT No.: PCT/US2016/051218
§ 371 (c)(1),
(2) Date: Mar. 19, 2018

(87) PCT Pub. No.: WO2017/058498
PCT Pub. Date: Apr. 6, 2017

(65) Prior Publication Data
US 2018/0265300 A1  Sep. 20, 2018

Related U.S. Application Data

(60) Provisional application No. 62/235,007, filed on Sep. 30, 2015.

(51) Int. Cl.
*B65G 15/34* (2006.01)
*B65G 15/42* (2006.01)
*A01D 61/02* (2006.01)
*A01D 57/20* (2006.01)

(52) U.S. Cl.
CPC ............. *B65G 15/42* (2013.01); *A01D 57/20* (2013.01); *A01D 61/02* (2013.01); *B65G 15/34* (2013.01)

(58) Field of Classification Search
CPC ........ B65G 15/42; B65G 15/30; B65G 15/32; B65G 15/34; B65G 15/44; A01D 61/02; F16G 1/00; F16G 9/00
USPC ........................................................ 198/847
See application file for complete search history.

(56) References Cited

U.S. PATENT DOCUMENTS

| | | | | |
|---|---|---|---|---|
| 2,305,044 A * | 12/1942 | Toews | ............ | B65G 15/42 198/690.2 |
| 2,899,242 A * | 8/1959 | Bombardier | ......... | B62D 55/244 305/167 |
| 3,622,209 A | 11/1971 | Leyden | | |
| 3,747,995 A * | 7/1973 | Russ, Sr. | ............. | B62D 55/244 305/170 |
| 4,553,663 A | 11/1985 | Johnson | | |

(Continued)

FOREIGN PATENT DOCUMENTS

WO    2015032527 A1    3/2015

*Primary Examiner* — James R Bidwell
(74) *Attorney, Agent, or Firm* — David L. Cate

(57) ABSTRACT

A draper belt (8) having a carry layer (14), a pulley cover layer (13), and a reinforcing layer (12) which is disposed between the carry layer (14) and the pulley cover layer (13). The draper belt (8) has a first edge (30) and a second edge (31), and cleats (7) on the carry layer (14) which run from the first edge (30) to the second edge (31) of the draper belt (8). The reinforcing rods (15, 18, 19, 20) contain metal. In some other aspects of the disclosure, two methods for ensuring adhesion between the reinforcing rods (15, 18, 19, 20) and the cleats (7) of the draper belt (8) are provided.

4 Claims, 6 Drawing Sheets

(56) References Cited

U.S. PATENT DOCUMENTS

| | | | | |
|---|---|---|---|---|
| 4,899,868 | A * | 2/1990 | Johnson | A01D 61/02 198/520 |
| 6,817,166 | B2 * | 11/2004 | Dunn | A01D 57/20 56/14.4 |
| 7,131,532 | B2 * | 11/2006 | Webster | B65G 15/52 198/867.15 |
| 7,478,521 | B2 * | 1/2009 | Coers | A01D 41/14 56/208 |
| 7,543,428 | B1 * | 6/2009 | Puryk | A01D 57/20 430/127 |
| 8,544,250 | B2 * | 10/2013 | Lovett | A01D 41/14 56/153 |
| 2007/0238565 | A1 | 10/2007 | Marler | |

* cited by examiner

DRAPER BELT HAVING IMPROVED CLEAT DESIGN

RELATED APPLICATION INFORMATION

This Patent Application claims priority to U.S. Provisional Patent Application No. 62/235,007 filed Sep. 30, 2015, and Patent Cooperation Treaty (PCT) Patent Application No. PCT/US2016/051218 filed Sep. 12, 2016, the disclosures of which are incorporated herein in their entirety, by reference.

FIELD

The field to which the disclosure generally relates is harvesting machines, and more particularly to draper belts having significantly more durable cleats.

BACKGROUND

This section provides background information to facilitate a better understanding of the various aspects of the disclosure. It should be understood that the statements in this section of this document are to be read in this light, and not as admissions of prior art.

Agricultural harvesting machines such as combine harvesters are used to reap, thresh, and winnow grain crops such as wheat, rye, barley, corn, soybeans, oats, flax, sunflower, and canola. More specifically, combine harvesters are used to cut grain crops at the base, separate the grains from the remainder of the plant (the chaff), and sort the grain from the chaff. These machines require special adaptations to accommodate specific crops, navigate through field landscapes, and resist damage from the crops, stone, and the elements; especially moisture and high temperature which can lead to the degradation of the machine's rubber components.

Generally harvesting machines gather crops using a header having crop dividers which define crop gathering gaps as the machine moves through a field. The gathered crops are pushed by a reel into a cutter bar, which runs the length of the header and is equipped with teeth made of metal or plastic to cut crops at their base. Headers may have a rigid or flexible header platform depending upon the operator's needs. Flexible header platforms, or "flex headers" have a cutter bar which is capable of flexing over uneven terrain. Machines using flex headers are most often used to cut soybeans, whereas conventional header platforms have a rigid cutter bar and are most often used to cut cereal crops. Freshly cut crops fall behind the cutter bar and onto a plurality of side by side draper belts which are wrapped around parallel spaced rollers. Draper belts function primarily to consolidate crops and move the crops from the header towards the threshing drum. Crops are fed into the threshing drum by spinning augurs. Inside the threshing drum, the grains are shaken from the plant. Grains fall through sieves into a grain collecting tank, and the plant waste, or chaff, is moved to the back of the machine by conveyor belts for later disposal.

Draper belts are an important component of agricultural harvesters. These belts are often subject to prolonged sun exposure, high temperatures, cold temperatures, rain and moisture, dirt and stone, as well as excessive friction from the moving machinery and crops. Furthermore water is known to migrate through the rubber belts carrying corrosive elements and salts which degrade the belt. Draper belts are typically called upon to operate for long periods of time. For these reasons, it is necessary that draper belts be specially adapted to maximize durability and service life, and it is desirable for such adaptations to be cost effective.

Some improvements in reducing the susceptibility of draper belts to damage have been made and are reported in the prior art. U.S. Pat. No. 8,544,250 discloses a draper platform having a center endless belt conveyor that is supported on and between first and second adjacent support arms. The endless conveyor belt has laterally extending cleats bonded thereto that engage the crop and assist in dragging the crop along the belt. U.S. Pat. No. 7,543,428 shows a seamless draper belt formed from an elongated flat base structure of fabric and rubber, and transverse cleats having a structural core embedded in rubber are connected to the base. Cleats formed from a structural core embedded in uncured rubber are positioned on one face of the base structure. The molding and curing of the rubber over the cleat cores and adjacent base structure is done leaving a portion of the base structure adjacent the first and second ends being uncured. The uncured ends are then overlapped and cured to form an endless seamless draper belt.

U.S. Pat. No. 6,817,166 describes a feed draper carrying cleats which are angled to the rollers in two sections converging to a central leading apex to reduce forces on the cleat as they pass over the front guide roller which is of reduced diameter to fit within a small space adjacent the cutter bar. Such cleats are often reinforced by a rod inside the molded material of the cleat, which is generally a resilient natural or synthetic rubber material. The draper canvas having on its outer surface a plurality of generally transversely extending longitudinally spaced cleats attached to the outer surface and extending outwardly there from for engaging the cop and providing a longitudinal force on the crop.

U.S. Pat. No. 7,478,521 discloses a cutting platform for use with an agricultural harvesting machine which includes a plurality of platform sections positioned in end-to-end juxtaposed relation to each other. At least one platform section includes a frame, a plurality of float arms movably coupled with the frame, an endless belt carried by the plurality of float arms, and a cutter bar assembly carried by the plurality of float arms and movable in a localized manner in upwards and downwards directions. The endless belt has a plurality of spaced apart cleats which do not extend to the lateral side edges thereof, allowing the belt to travel between belt guides and upper run carriers without unnecessary clearance space there between.

It is common for draper belts of the prior art to fail for one or more reasons. Frequently draper belt cleats become worn and damaged from use, and this exposes fiberglass rods within the cleats which provide the cleats with lateral support. To reduce this problem, manufacturers of agricultural machinery have redesigned combine headers and the like; however, draper belt cleats remain unusually prone to damage and wear in all known machine and header designs. Accordingly there is a need for a specially adapted draper belt having significantly more durable cleats than the draper belt cleats of the prior art.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments of the disclosure are directed to specially adapted draper belts which offer improved durability and an extended service life. The draper belts of this disclosure include cleats having enhanced resistant to damage. This improved resistance to damage is attained by virtue of the cleats in the draper belts of this disclosure being made with reinforcing rods which are comprised of a metal, such as carbon steel. The metal rods used in the cleats of the draper belts of this disclosure are a significant improvement over the nylon and fiberglass rods of the prior art for at least four reasons. First, the metal rods provide excellent lateral support to the cleats at a minimal cost. Second, the draper belts of this disclosure have improved processing times. Third, the metal rods are more wear resistant than the nylon or fiberglass rods of the prior art. Fourth, the metal rods can be made to have better adhesion to the rubber cleats than nylon or fiberglass reinforcing rods.

In some embodiments of the disclosure, draper belts have a carry layer, a pulley cover layer, and a reinforcing layer which is situated between the carry layer and the pulley cover layer, wherein the draper belt has a first edge and a second edge, wherein the carry layer includes a plurality of cleats which run from the first edge to the second edge of the draper belt, and wherein the cleats are reinforced with reinforcing rods which are comprised of a metal.

This disclosure further provides methods for adhering metal reinforcing rods to cleats, the methods including extruding wire strips with an adhesive compound, wherein the wire is comprised of the metal to be used in the reinforcing rods, cutting the extruded wire strips and strips of fabric to specified lengths, wherein the fabric is comprised of the fabric to be used in the cleats, laying the extruded wire strips onto the fabric strips, curing the fabric strips and the wire, and simultaneously adding steel and rubber composite into a cavity centrally located within the cleat.

Additionally this disclosure provides methods for adhering metal reinforcing rods to cleats, the methods including coating steel cord with brass and applying a rubber to the cords, and pressing the coated cord and rubber compound into a series of rollers until the cord is adhered to the rubber, wherein the reinforcing rods are comprised of the coated steel cord and the cleats are comprised of the rubber.

This disclosure further provides an improvement in a draper belt having a pulley cover layer, a carry layer, and a reinforcing layer which is situated between the pulley cover layer and the carry layer, wherein the carry layer includes a plurality of cleats which include reinforcing rods, the improvement which comprises utilizing reinforcing rods which are comprised of a metal.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and wherein.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
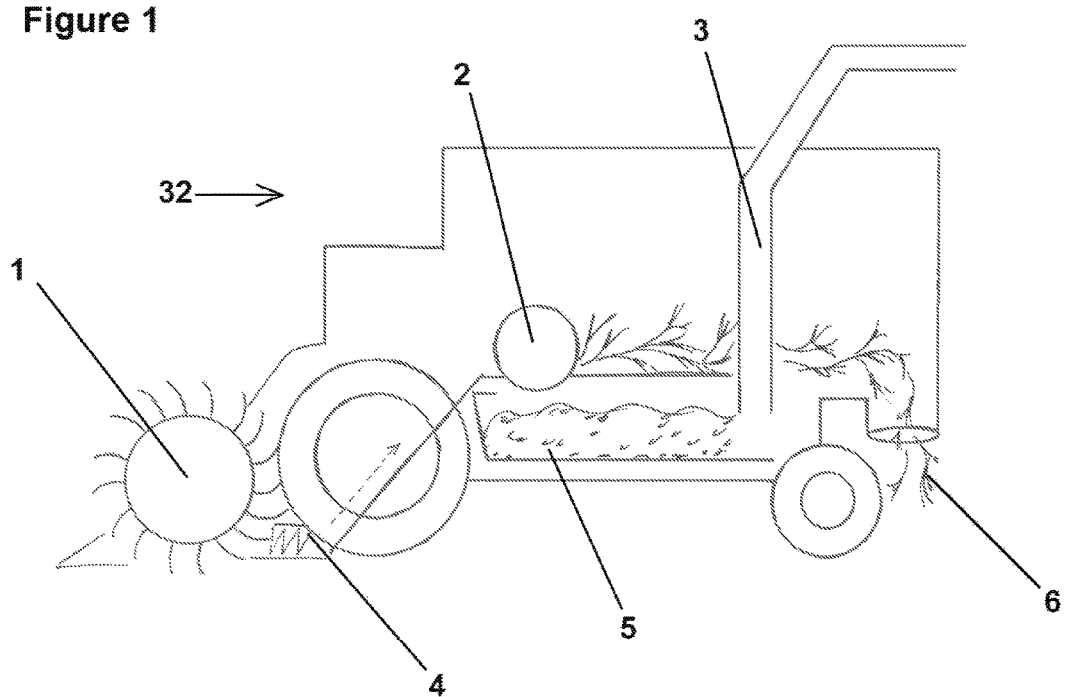
FIG. 1 shows a general cross-sectional view of a conventional agricultural harvesting machine.

FIG. 1 depicts a conventional harvesting machine 32 having a reel 1, a cutter bar 4, a threshing drum 2, and a grain elevator 3. The reel 1 functions to move crops into the cutter bar 4 which cuts the crops at their base using metal or plastic teeth. Cut crops fall upon a plurality of side by side draper belts which consolidate the crops and move them towards the threshing drum 2. The threshing drum 2 beats and breaks the crops to shake the grains 5 from the remainder of the plant, also known as the chaff 6. The grains 5 are collected inside a grain collecting tank. When the grain collecting tank is full, operators dispose of the chaff 6 through the back of the machine 32, and grains 5 are moved from the grain tank by a grain elevator 3.

Figure 2:
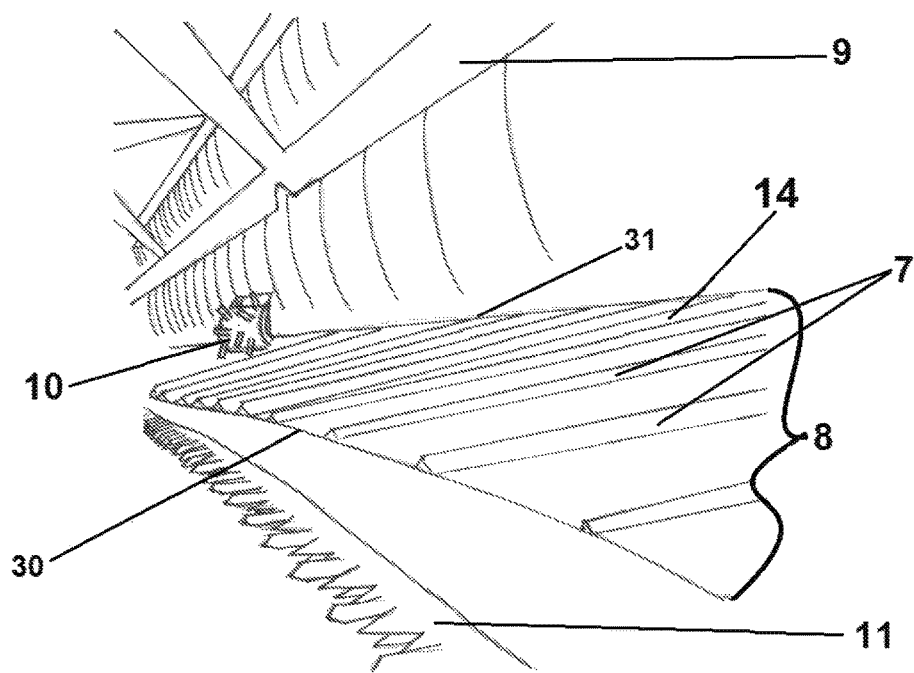
FIG. 2 illustrates a draper belt as used in a conventional agricultural harvesting machine, in a perspective view.

FIG. 2 shows a draper belt 8 of this disclosure as used in a conventional agricultural harvesting machine having a reel 9, a threshing drum 10, and a cutter bar 11. The draper belt 8 is typically an endless belt which forms a continuous loop, and the ends of this belt can be fused, bonded, riveted, or secured by a mechanical splice. The draper belt 8 has cleats 7 located on carry layer 14, and the cleats 7 run from a first edge 30 and a second edge 31 of the draper belt 8. The carry 14 layer can be chosen from a wide variety of rubbery polymers having a desired combination of physical properties and chemical resistance. Most often, draper belts 8 of this disclosure are made using styrene-butadiene rubber (SBR).

Figure 3:
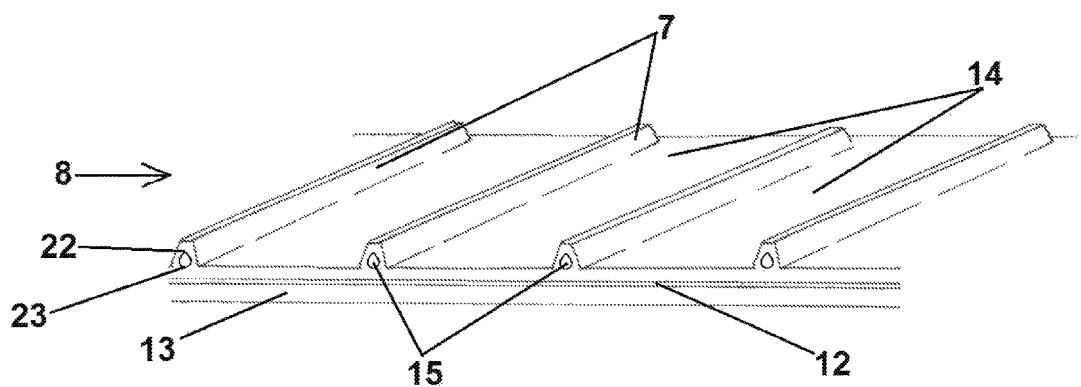
FIG. 3 depicts a portion of a draper belt having cleats in accordance with this disclosure, in a perspective view.

FIGS. 3 through 6 show some embodiments of the draper belt 8 of this disclosure. FIG. 3 shows a draper belt 8 having a carry layer 14, a pulley cover layer 13, and a reinforcing layer 12 located between the carry layer 14 and the pulley cover layer 13. The carry layer 14 includes a plurality of cleats 13 reinforced with reinforcing rods 15.

Figure 4:
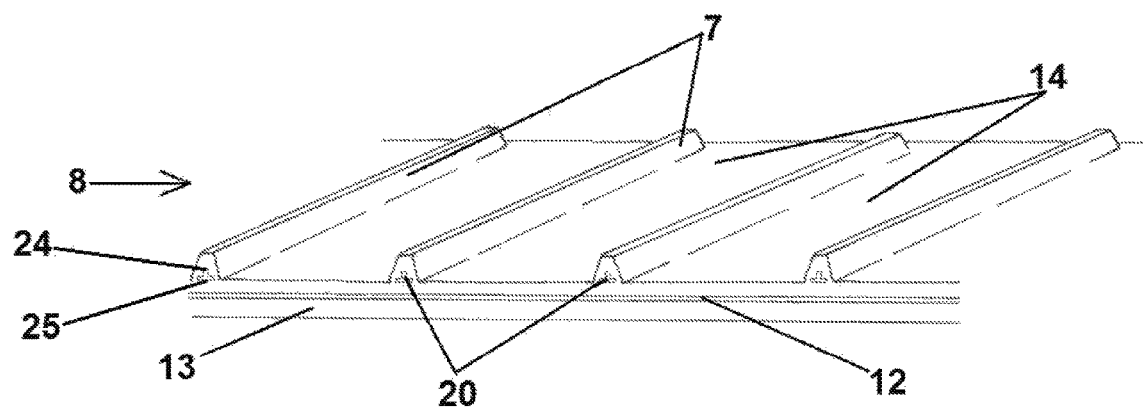
FIG. 4 shows a portion of one embodiment of a draper belt having cleats according to the disclosure, in a perspective view.

The draper belt 8 of FIG. 3 shows that the reinforcing rods 15 can be designed to have a teardrop shape. The teardrop shaped rod 15 generally has a rounded end 23 pointing towards the reinforcing layer 12 of the belt 8, and a pointed or narrowed end 22 pointing upwards from the carry layer 14 of the belt 8. FIG. 4 shows that the reinforcing rods 20 can be designed to have an inverted "T" shape. The inverted "T" shaped rod 20 has a flattened elongated end 25 facing the reinforcing layer 12 of the belt 8, and a pointed or narrowed end 24 pointing upwards from the carry layer 14 of the belt.

Figure 5:
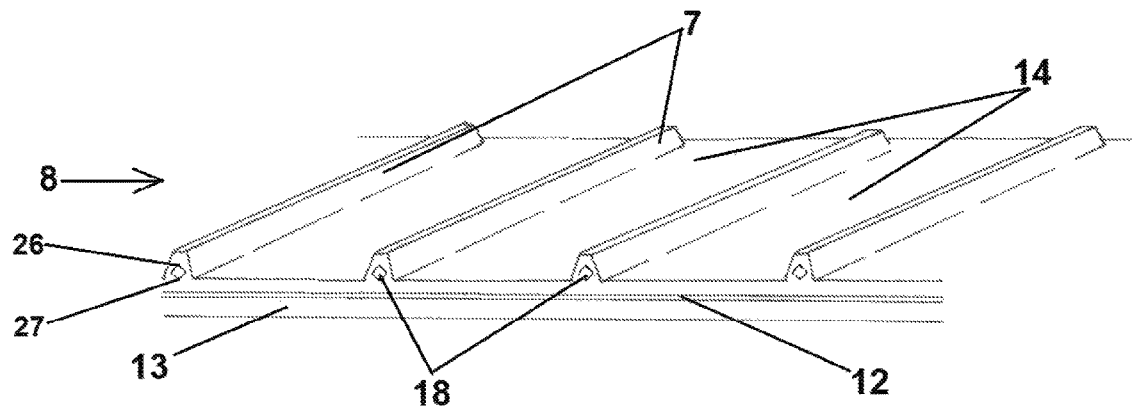
FIG. 5 illustrates a portion of an embodiment of a draper belt having cleats according to the disclosure, in a perspective view; and, FIG. 6 depicts a portion of an embodiment of a draper belt having cleats according to the disclosure, in a perspective view.

The draper belt 8 of FIG. 5 shows that the reinforcing rods 18 of this disclosure can be designed to have a diamond or squared shape. The diamond shape of these reinforcing rods 18 may have rounded points or sharp points at each end 26, 27, and each end 26, 27 of the diamond shaped reinforcing rod 18 is substantially the same in size. In alternative embodiments the top end 26 of the diamond shaped rod 18 can be narrower than the lower end 27 of the diamond shaped rod 18.

Figure 6:
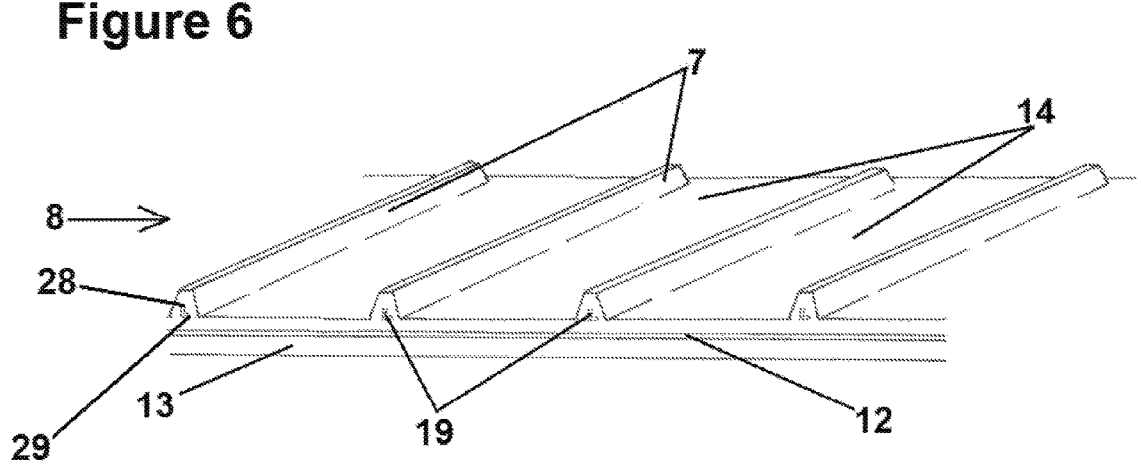

The draper belt 8 of FIG. 6 shows that the reinforcing rods 19 of this disclosure can be designed to have an "L" shape. The "L" shaped rod 19 has a bottom end 29 facing towards the reinforcing layer 12 of the belt 8, and a pointed or narrowed top end 28 pointing upwardly from the carry layer 14 of the belt. The top and bottom ends 28, 29 are roughly perpendicular to one another, in a manner which allows them to meet at an angle of approximately 90°. In an alternative embodiment of this disclosure the reinforcing rods can be of a "J" shape wherein the bottom end 29 of the reinforcing rod 19 curves away from the top end 28 of the reinforcing rod 19.

The reinforcing rods 15, 18, 19, 20, of this disclosure can be of any desirable shape to reinforce the cleat. In one embodiment of this disclosure the rods 15, 18, 19, 20 are comprised of a twisted cable steel tire cord. In a second scenario the steel cord is comprised of single strand, multi-end strips of wire which are extruded with an adhesive compound in order to facilitate proper adhesion between the steel cord and the fabric of the cleats. Stranded wire is more flexible than solid wire of equal size, and for this reason it is ideal for use in reinforcing rods 15, 18, 19, 20.

More specifically, under this scenario the steel cord can be adhered to the cleats 7 through the following steps. First, single strand, multi-end strips of wire are extruded with an adhesive compound. The rods 15, 18, 19, 20 are comprised of these wires. Second, the extruded strips of wire and strips of fabric are cut to the lengths of the cleats 7. The cleats 7 are comprised of these fabric strips. Third, the extruded strips of wire are laid onto the strips of fabric.

In one embodiment of this disclosure, twisted cable steel tire cord is calendered or single or multi-end strips of wire are extruded with an adhesive compound. The fabric is cut into strips to the specified length of the belt cleat. The extruded strips are also cut to length. The steel/rubber composite is then laid at the cleat location on the belt built ply-up. During the curing process, the steel/rubber composites flow into the cleat cavity. As the rubber cures the composite reinforces the cleat providing transverse rigidity to the belt. Woven fabric tire cord could also be used for reinforcement depending upon stiffness requirements. In other embodiments of this disclosure wire, woven wire, textile material or monofilament can be used to reinforce or stiffen cleats on draper belts and flat belts. The cleat shapes can be extruded to approximately the shape desired and bonded to the belt at cure or in a secondary cure process step. In another embodiment of this disclosure a wire, woven wire, textile material or monofilament is used to reinforce or stiffen cleats on the belt. These reinforcement members can be applied to the belt at build or at a cure location and allowed to flow into the cleat giving the product structural stiffness in the cross or transverse direction.

In another embodiment of this disclosure as ultra-high molecular weight polyethylene strip is conformed into the desired shape of the cleat. This provides a contained reinforcement at minimal cost and with improved processing times. It also provides better adhesion levels between the rubber cleat compound and the reinforcement than is typically attained using conventional fiberglass reinforcing rods. This reduces failure due to inadequate adhesion which frequently occurs using conventional technology.

LIST OF REFERENCE SIGNS (PART OF THE DESCRIPTION)

1 Reel
2 Threshing Drum
3 Grain Elevator
4 Cutter Bar
5 Grains
6 Chaff
7 Cleat
8 Draper Belt
9 Reel
10 Threshing Drum
11 Cutter Bar
12 Reinforcing Layer
13 Pulley Cover Layer
14 Carry Layer
15 Reinforcing Rod
18 Reinforcing Rod
19 Reinforcing Rod
20 "T" Shaped Reinforcing Rod
22 Pointed or Narrowed End
23 Rounded End
24 Pointed or Narrowed End
25 Flattened Elongated End 26 Top End
27 Lower End
28 Pointed or Narrowed Top End
29 Bottom End
30 First Edge
31 Second Edge
32 Harvesting Machine The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A draper belt comprising a carry layer, a pulley cover layer, and a reinforcing layer which is situated between the carry layer and the pulley cover layer, wherein the draper belt has a first edge and a second edge, wherein the carry layer includes a plurality of cleats which run from the first edge to the second edge of the draper belt, wherein the cleats are reinforced with reinforcing rods, and wherein the reinforcing rods are adhered to the cleats by:
   extruding wire strips with an adhesive compound, wherein the wire is comprised of metal to be used in the reinforcing rods;
   cutting the extruded wire strips and strips of fabric to specified lengths, wherein the fabric is comprised of the fabric to be used in the cleats;
   laying the extruded wire strips onto the fabric strips; and,
   curing the fabric strips and the wire, and simultaneously adding steel and rubber composite into a cavity centrally located within the cleats.

2. The draper belt as claimed in claim 1, wherein the reinforcing rods are comprised of single strand, multi-end strips of wire.

3. The draper belt as claimed in claim 1, wherein the reinforcing rods comprise woven wire, woven fabric cord, textile material, or monofilament.

4. The draper belt as claimed in claim 1, wherein the reinforcing rods further comprise an ultra-high molecular weight polyethylene.

* * * * *